(12) United States Patent
Totman et al.

(10) Patent No.: US 7,454,714 B2
(45) Date of Patent: Nov. 18, 2008

(54) VISUALLY DISTINGUISHING MENU ITEMS

(75) Inventors: Scott V. Totman, Vienna, VA (US); Jeffrey David Kimball, Great Falls, VA (US); Steve Clark, Oakton, VA (US); James Andrew Canfield, Arlington, VA (US); Elisa Nader, Ashburn, VA (US); Thomas Brent Canfield, Ashburn, VA (US); Keith R. Deaven, Lansdowne, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 1224 days.

(21) Appl. No.: 10/112,029

(22) Filed: Apr. 1, 2002

(65) Prior Publication Data

US 2003/0011641 A1 Jan. 16, 2003

Related U.S. Application Data

(60) Provisional application No. 60/279,736, filed on Mar. 30, 2001.

(51) Int. Cl.
*G06F 3/048* (2006.01)
*G06F 3/14* (2006.01)

(52) U.S. Cl. .................. 715/841; 715/810; 715/825; 715/826

(58) Field of Classification Search ............... 715/834, 715/810, 845, 841, 826, 825; 709/221
See application file for complete search history.

(56) References Cited

U.S. PATENT DOCUMENTS

| | | | | |
|---|---|---|---|---|
| 4,570,217 A | | 2/1986 | Allen et al. | |
| 5,041,967 A | * | 8/1991 | Ephrath et al. | 715/825 |
| 5,065,345 A | | 11/1991 | Knowles et al. | |
| 5,119,475 A | * | 6/1992 | Smith et al. | 715/866 |
| 5,179,653 A | * | 1/1993 | Fuller | 715/840 |
| 5,261,042 A | * | 11/1993 | Brandt | 715/841 |
| 5,283,560 A | * | 2/1994 | Bartlett | 715/729 |
| 5,379,375 A | * | 1/1995 | Dao et al. | 715/862 |
| 5,473,536 A | | 12/1995 | Wimmer | |
| 5,485,175 A | * | 1/1996 | Suzuki | 715/841 |
| 5,517,606 A | * | 5/1996 | Matheny et al. | 715/810 |
| 5,530,796 A | * | 6/1996 | Wang | 715/762 |
| 5,559,944 A | * | 9/1996 | Ono | 715/841 |
| 5,581,685 A | * | 12/1996 | Sakurai | 715/841 |

(Continued)

OTHER PUBLICATIONS

Apple Computer Co., Inc. Inside Macintosh, Macintosh Toolbox Essentials 1992, http://developer.apple.com/documentation/mac/toolbox/Toolbox-2.html, pp. 3-5 thru 3-157.*

(Continued)

*Primary Examiner*—Weilun Lo
*Assistant Examiner*—Steven B Theriault
(74) *Attorney, Agent, or Firm*—Fish & Richardson P.C.

(57) ABSTRACT

A graphical toolbar user interface is rendered and has one or more menu items. Each menu item has one or more visual identifier to distinguish the menu item from other of the menu items. At least one menu item has one or more submenu items. The submenu item has one or more visual identifiers of the corresponding menu item to distinguish the submenu item from submenu items corresponding to other of the menu items.

64 Claims, 11 Drawing Sheets

U.S. PATENT DOCUMENTS

| | | | | |
|---|---|---|---|---|
| 5,596,699 | A * | 1/1997 | Driskell | 715/834 |
| 5,598,523 | A * | 1/1997 | Fujita | 715/840 |
| 5,617,114 | A * | 4/1997 | Bier et al. | 345/634 |
| 5,644,738 | A * | 7/1997 | Goldman et al. | 715/825 |
| 5,701,424 | A * | 12/1997 | Atkinson | 715/808 |
| 5,708,787 | A * | 1/1998 | Nakano et al. | 715/841 |
| 5,745,115 | A * | 4/1998 | Purple et al. | 715/810 |
| 5,760,768 | A * | 6/1998 | Gram | 715/747 |
| 5,760,776 | A * | 6/1998 | McGurrin et al. | 715/841 |
| 5,774,120 | A * | 6/1998 | Goddard et al. | 715/845 |
| 5,781,247 | A * | 7/1998 | Wehmeyer et al. | 348/569 |
| 5,798,760 | A * | 8/1998 | Vayda et al. | 715/834 |
| 5,801,703 | A * | 9/1998 | Bowden et al. | 715/841 |
| 5,805,167 | A * | 9/1998 | van Cruyningen | 715/808 |
| 5,828,360 | A * | 10/1998 | Anderson et al. | 715/834 |
| 5,828,376 | A * | 10/1998 | Solimene et al. | 715/821 |
| 5,860,073 | A * | 1/1999 | Ferrel et al. | 715/522 |
| 5,862,395 | A * | 1/1999 | Bier | 712/1 |
| 5,892,512 | A * | 4/1999 | Donnelly et al. | 715/764 |
| 5,926,178 | A * | 7/1999 | Kurtenbach | 715/834 |
| 5,940,076 | A * | 8/1999 | Sommers et al. | 715/834 |
| 5,946,696 | A * | 8/1999 | Young | 707/104.1 |
| 5,999,180 | A * | 12/1999 | Coskrey, IV | 715/810 |
| 6,002,402 | A * | 12/1999 | Schacher | 715/810 |
| 6,029,196 | A * | 2/2000 | Lenz | 709/221 |
| 6,032,024 | A | 2/2000 | Makino | |
| 6,037,942 | A * | 3/2000 | Millington | 715/835 |
| 6,065,047 | A * | 5/2000 | Carpenter et al. | 709/218 |
| 6,088,031 | A * | 7/2000 | Lee et al. | 715/862 |
| 6,104,399 | A * | 8/2000 | Volkel | 715/841 |
| 6,111,576 | A * | 8/2000 | Moreland et al. | 715/841 |
| 6,118,450 | A * | 9/2000 | Proehl et al. | 715/810 |
| 6,121,968 | A * | 9/2000 | Arcuri et al. | 715/825 |
| 6,131,098 | A * | 10/2000 | Zellweger | 707/102 |
| 6,133,915 | A * | 10/2000 | Arcuri et al. | 715/779 |
| 6,144,378 | A * | 11/2000 | Lee | 715/767 |
| 6,177,941 | B1 * | 1/2001 | Haynes et al. | 715/810 |
| 6,185,582 | B1 | 2/2001 | Zellweger et al. | |
| 6,239,803 | B1 * | 5/2001 | Driskell | 715/810 |
| 6,248,946 | B1 | 6/2001 | Dwek | |
| 6,256,649 | B1 | 7/2001 | Mackinlay et al. | |
| 6,278,450 | B1 * | 8/2001 | Arcuri et al. | 715/763 |
| 6,414,700 | B1 * | 7/2002 | Kurtenbach et al. | 715/810 |
| 6,456,304 | B1 * | 9/2002 | Angiulo et al. | 715/779 |
| 6,469,719 | B1 * | 10/2002 | Kino et al. | 715/810 |
| 6,490,443 | B1 * | 12/2002 | Freeny, Jr. | 455/406 |
| 6,549,219 | B2 * | 4/2003 | Selker | 715/834 |
| 6,563,521 | B1 * | 5/2003 | Perttunen | 715/854 |
| 6,618,063 | B1 * | 9/2003 | Kurtenbach | 715/834 |
| 6,693,652 | B1 * | 2/2004 | Barrus et al. | 715/838 |
| 6,810,410 | B1 * | 10/2004 | Durham | 709/203 |
| 2003/0014752 | A1 * | 1/2003 | Zaslavsky et al. | 725/40 |

OTHER PUBLICATIONS

Samuelson, Pamela, "Why the look and feel of software user interfaces should not be protected by copyright law", May 1989, Communications of the ACM, Management of Computing, vol. 32 pp. 563-572.*

Sun Computer Systems, "Sun Product Documentation, Solaris Common Desktop Environment: Advanced user's and systems adminstrators guide", 1994, pp. 1-16.*

Hudson, Scott et al,"Supporting Dynamic Downloadable Appearances in an Extensible user Inferface Toolkit" 1997, Communications of the ACM, pp. 159-168.*

Sharp, Alec, "Changing Widget at Runtime", 1997, Small-Talk Books, Chapter 26, pp. 1-11; http://www.iam.unibe.ch/~ducasse/Webpages/Freebooks.html.*

Apple Computer Co, Inc, "The Appearance Manager", Nov. 27, 2000, pp. 1-5, http://developer.apple.com/documentation/Carbon/Conceptual/ProgAppearance_Manager/Concepts/AppearanceManager.htm.*

Sun Computer Systems, Inc. "The Java Tutorial, How to use menus", pp. 1-9; http://web.archive.org/web/20001212025100/www.java.sun.com/docs/books/tutorial/uiswing/components/menu.html.*

Birch Randy, "Changing application menu colours without affecting the system", Feb. 15, 2003, pp. 1-7, http://vbnet.mvps.org/code/menu/menucolor.htm.*

Macromedia, inc. et al "Using Dreamweaver" 2000□□http://web.archive.org/web/20010208100203/www.macromedia.com/support/dreamwaever/documentation.html.*

Galen Gruman and Jim Heid, "Macintoch Innovations," *MacWorld*, v11n2, pp. 86-98, Feb. 1994.

"The 8th Annual Editors' Choice Awards," *MacUser*, v9, n3, pp. 91-106, Mar. 1993.

Nick Wilgus, "Things to Come: When it's time for a bit of Windows-dressing: If you've just got to be you, here's how to go about it," Bangkok Post, p. 7, Aug. 1, 2001.

Freeze.com:A new degree of free, pp. 1-2, Aug. 27, 2001, http://www.freeze.com/cat/MP3_Skins48064.html.

The FAQchest, "SuperCard Digest Oct. 2, 1997," pp. 1-28, Aug. 31, 2001, http://faqchest.dynhost.com/cgi-bin/cleanprint.pl.

* cited by examiner

VISUALLY DISTINGUISHING MENU ITEMS

This application claims priority from U.S. Provisional Application No. 60/279,736, filed Mar. 30, 2001, which is incorporated by reference.

TECHNICAL FIELD

The following description relates generally to providing a graphical user interface and more particularly to grouping menu items in a graphical user interface.

BACKGROUND

Online service providers are constantly offering new services and upgrading existing services to enhance their users' online experience. Users have on-demand access to news, weather, financial, sports, and entertainment services as well as the ability to transmit electronic messages and to participate in online discussion groups. For example, users of online service providers such as America Online or CompuServe may view and retrieve information on a wide variety of topics from servers located throughout the world. A server may be maintained by the service provider or by a third party provider who makes information and services available through the worldwide network of computers that make up the online service.

Online service providers facilitate access to information and services by providing interactive UIs (User Interfaces) that help users navigate to desired resources. UIs often take advantage of the graphics capabilities of a user's computer and eliminate the need to type in text commands. Generally, a UI allows a user to simply select screen objects such as icons, windows, and drop-down menus to execute particular commands or to link to certain locations. The design of a UI is very important to a user's online experience. In particular, the icons, windows, and menus of a UI must be arranged to enable a user to locate preferred information and services quickly and easily.

SUMMARY

In one general aspect, menu items of a graphical user interface may be grouped by rendering a toolbar user interface having one or more menu items. Each menu item has one or more visual identifiers, and at least one menu item has one or more submenu items. A submenu item is rendered, and has one or more visual identifiers of the corresponding menu item to distinguish the submenu item from submenu items corresponding to another of the menu items.

Implementations may include one or more of the following features. For example, the visual identifier may include a color, a shading, a visual texture, or a font. In one implementation, each visual identifier of each menu item differs from all visual identifiers corresponding to other menu items. In another implementation, a visual identifier of a menu item differs from a visual identifier corresponding to an adjacent menu item in order to distinguish the menu item from the adjacent menu item. In yet another implementation, a visual identifier of a menu item differs from a visual identifier corresponding to each adjacent menu item in order to distinguish the menu item from each adjacent menu item.

The visual identifier of a menu item may be unique from the visual identifiers of other of the menu items. A title bar may establish the visual identifiers corresponding to the menu items. The visual identifier of a menu item may be shared with a non-menu item. In one implementation, a menu item help message may be rendered when, for example, a user positions a pointing device over a menu item, and the menu item help message may have a visual identifier that is the same as the visual identifier of the corresponding menu item. The submenu item may include a drop-down menu selection or a glow button. The submenu item may have a customized link to an object that is configured to share the submenu item visual identifier.

In one implementation, the visual identifier associated with at least one menu item is modified. The visual identifier may be modified automatically or manually, and the modification may occur periodically. The visual identifier may be automatically modified based on a modification to a visual identifier of at least one other menu item. The visual identifier also may be periodically modified based on a modification to a visual identifier of at least one other menu item. Further, the visual identifier of a submenu item may be modified based upon a modification to the visual identifier of the corresponding menu item. The visual identifier of the submenu item may be modified automatically or periodically. Modification of visual identifiers may be done by a client system or by a host system.

The graphical interface toolbar may include any combination of menu bars, icon bars, and navigation bars. In one implementation, at least one menu bar includes multiple menu items, with one or more menu items being associated with a corresponding drop-down menu item. The function associated with the menu item may be one of a direct action and a call to invoke a drop-down submenu item. At least one icon bar may include multiple icons, with each icon configured to initiate a particular function associated with the icon. At least one navigation bar may include at least one navigation button, input box, and/or action button.

Aspects of the toolbar user interface may be implemented by an apparatus and/or by a computer program stored on a computer readable medium. The computer readable medium may comprise a disc, a client device, a host device, and/or a propagated signal. In addition, aspects of the toolbar user interface may be implemented in a client/host context or in a standalone or offline client device. The toolbar user interface may be rendered in a client/host context and may be accessed or updated through a remote device in a client/host environment. The toolbar user interface also may be rendered by the standalone/offline device and may be accessed or updated through a remote device in a non-client/host environment such as, for example, a LAN server serving an end user or a mainframe serving a terminal device.

Other features and advantages will be apparent from the following description, including the drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

Like reference symbols in the various drawings indicate like elements.

DETAILED DESCRIPTION

In general, a rendered toolbar user interface (UI) may have one or more menu items. The menu items typically have one or more visual identifiers that distinguish the menu item from other menu items such as a color, a shading, a visual texture, or a font. A menu item may have one or more associated submenu items. A rendered submenu item has one or more of the visual identifiers of the corresponding menu item which enables the submenu item to be distinguished from submenu items associated with different menu items. Coordination of visual identifiers such as color may be established in a title bar of the toolbar UI or otherwise.

For instance, a rendered toolbar user interface having two menu items may include a first menu item having a visual identifier of a first background color (e.g., blue) and a second menu item having a visual identifier of a second background color (e.g., red). Furthermore, the first menu item may have two associated submenu items, each of which shares at least one visual identifier of the first menu item (e.g., the blue background color). Similarly, the second menu item may have three associated submenu items, each of which shares at least one visual identifier of the second menu item (e.g., the red background color).

The toolbar user interface may be rendered by any type of hardware, software, device, computer, computer system, equipment, component, program, application, code, storage medium, or propagated signal. In one implementation, the toolbar user interface may be rendered in a client/host context, and the toolbar user interface may be accessed or updated through a remote device in a client/host environment. In another implementation, the toolbar user interface may be implemented in a standalone or offline client context. The toolbar user interface may be rendered by the standalone/offline device and may be accessed or updated through a remote device in a non-client/host environment such as, for example, a LAN server serving an end user or a mainframe serving a terminal device.

Figure 1:
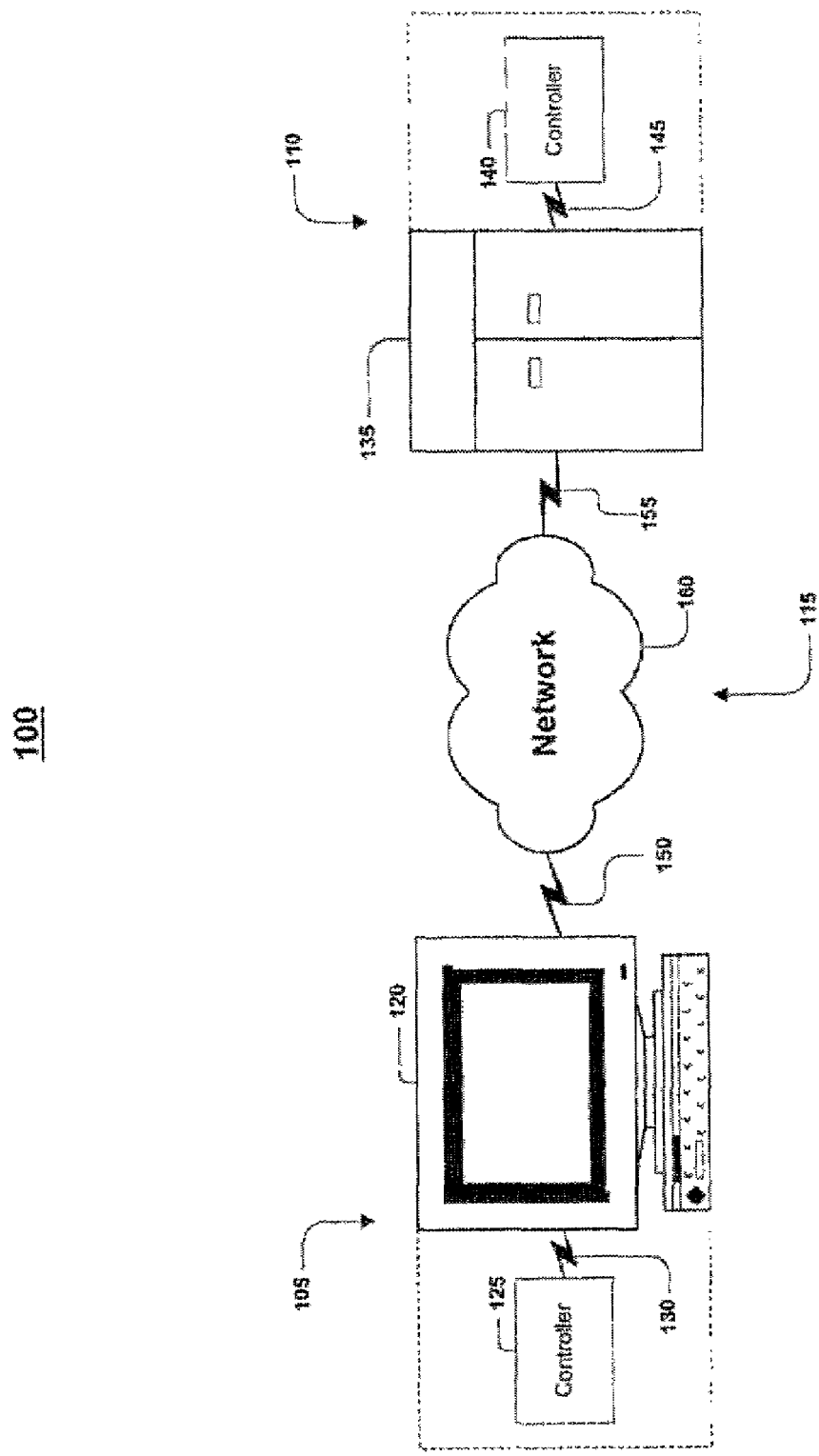
FIG. 1 is a block diagram of a communications system.
Figure 2:
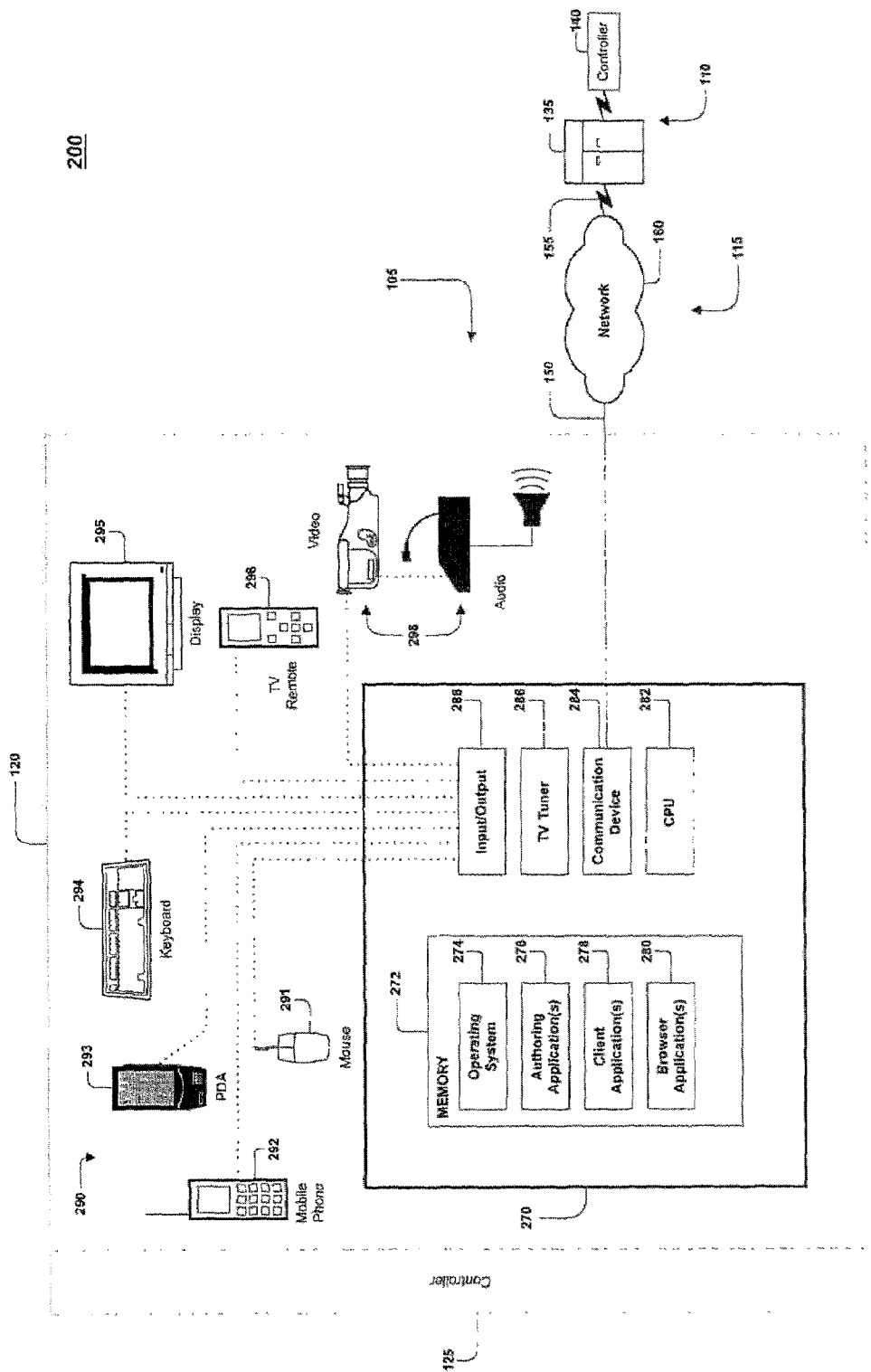
FIG. 2 is a block diagram of an expansion of aspects of the communications system of FIG. 1.

For illustrative purposes, FIGS. 1 and 2 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 and the host device 135 are generally capable of executing instructions under the command of, respectively, a client controller 125 and a host controller 140. The client device 120 and the host device 135 are connected to, respectively, the client controller 125 and the host controller 140 by, respectively, wired or wireless data pathways 130 and 145, which are capable of delivering data.

The client device 120, the client controller 125, the host device 135, and the host controller 140 each typically include one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination of these capable of responding to and executing instructions. The client device 120 and the host device 135 may include devices that are capable of peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 and the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, or satellite systems, and any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

FIG. 2 illustrates a communications system 200 including a client system 105 communicating with a host system 110 through a communications link 115. System 200 is one possible implementation of the communications system 100 of FIG. 1.

The client device 120 typically includes a general-purpose computer 270 having an internal or external storage 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 125. In one implementation, the client controller 125 includes one or more of the application programs installed on the internal or external storage 272 of the general-purpose computer 270. In another implementation, the client controller 125 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 115 through a wired or wireless data pathway 150. The general purpose computer 270 also may be a television ("TV") tuner 286 for receiving television programming in the form of broadcast, satellite, and/or cable TV signals. As a result, the client device 120 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), an MP3 player (not shown), a keyboard 294, a display monitor 295 with or without a touch screen input, a TV remote control 296 for receiving information from and rendering information to users, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 120. For example, the mobile phone 292 or the PDA 293 may include computing and networking capabilities and function as a client device 120 by accessing the delivery network 160 and communicating with the host system 110. Furthermore, the client system 105 may include one, some or all of the components and devices described above.

A graphical user interface may be displayed on the display monitor 295 or other peripheral device 290. The graphical user interface may include a graphical user interface toolbar, which may include any combination of menu bars, icon bars, and/or navigation bars. The graphical user interface toolbar may include one or more menu items, examples of which include buttons, such as glow buttons, which may be associated with corresponding actions or a drop-down menu items. Furthermore, a menu item may include one or more submenu items typically related thereto and typically included in a drop-down menu item. For example, a menu item for e-mail services may include a drop-down menu having submenu items for composing and sending e-mail messages.

Submenu items generally have one or more of the visual identifiers of associated menu items. For example, a submenu item generally shares one or more of a distinguishing color, shading, texture or font with an associated menu item to enable perception of a relationship between the menu item and the submenu item.

Figure 3A:
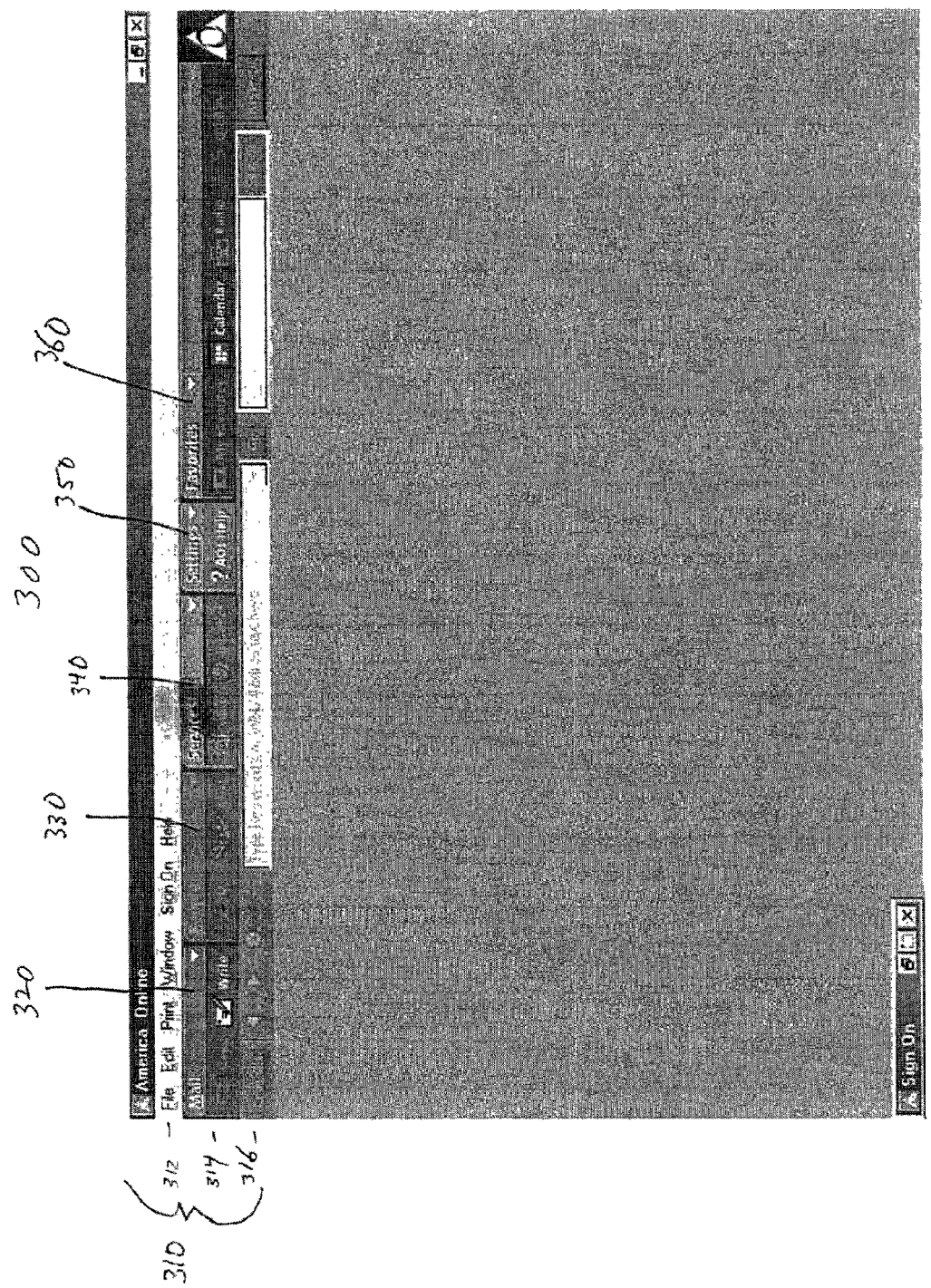
FIGS. 3A, 3B, and 4-9 are illustrations of different graphical user interfaces that may be implemented by the system of FIGS. 1 and 2 when executing the process of FIG. 10.

FIG. 3A illustrates one example of a graphical UI 300, which example may be presented to a user of an Online Service Provider (OSP) such as America Online (AOL). In general, the graphical UI 300 will be rendered on the user's client system 105 using software stored on that client system 105. The UI 300 contains one or more menu items, and each menu item has one or more visual identifiers. The visual identifier of a given menu item generally differs from the visual identifier of at least one other menu item, and may differ from the visual identifiers of all other menu items such that one or all menu items have unique visual identifiers. The visual identifiers may include, for example, a color, a shading, a texture, or a font. A visual identifier may include, for example, different shadings, hues, and tones of a color as being the same color. In other implementations, different shadings, hues, and tones of a color may be treated as different colors.

The graphical UI 300 includes a toolbar UI 310 for quickly using many features of the OSP, such as, for example, reading and writing email, exchanging IM messages with another user, entering chat areas with other users, shopping, or accessing the Internet. The toolbar 310 includes, for example, a menu bar 312, an icon bar 314, and a navigation bar 316.

The menu bar 312, the icon bar 314, and the navigation bar 316 each contain menu items. For example, the icon bar 314 includes menu items for Mail 320, People 330, Services 340, Settings 350, and Favorites 360. Each of these menu items has a visual identifier that is different from the visual identifier of the other menu items. For example, color is the visual identifier used with the implementation of the icon bar 314 shown in FIG. 3A. The Mail menu item 320 is colored blue, the People menu item 330 is colored green, the Services menu item 340 is colored purple, the Settings menu item 350 is colored aqua, and the Favorites menu item 360 is colored maroon. Notably, as illustrated by this example, the visual identifier of each menu item differs from the visual identifier of at least an adjacent menu item.

Figure 3B:
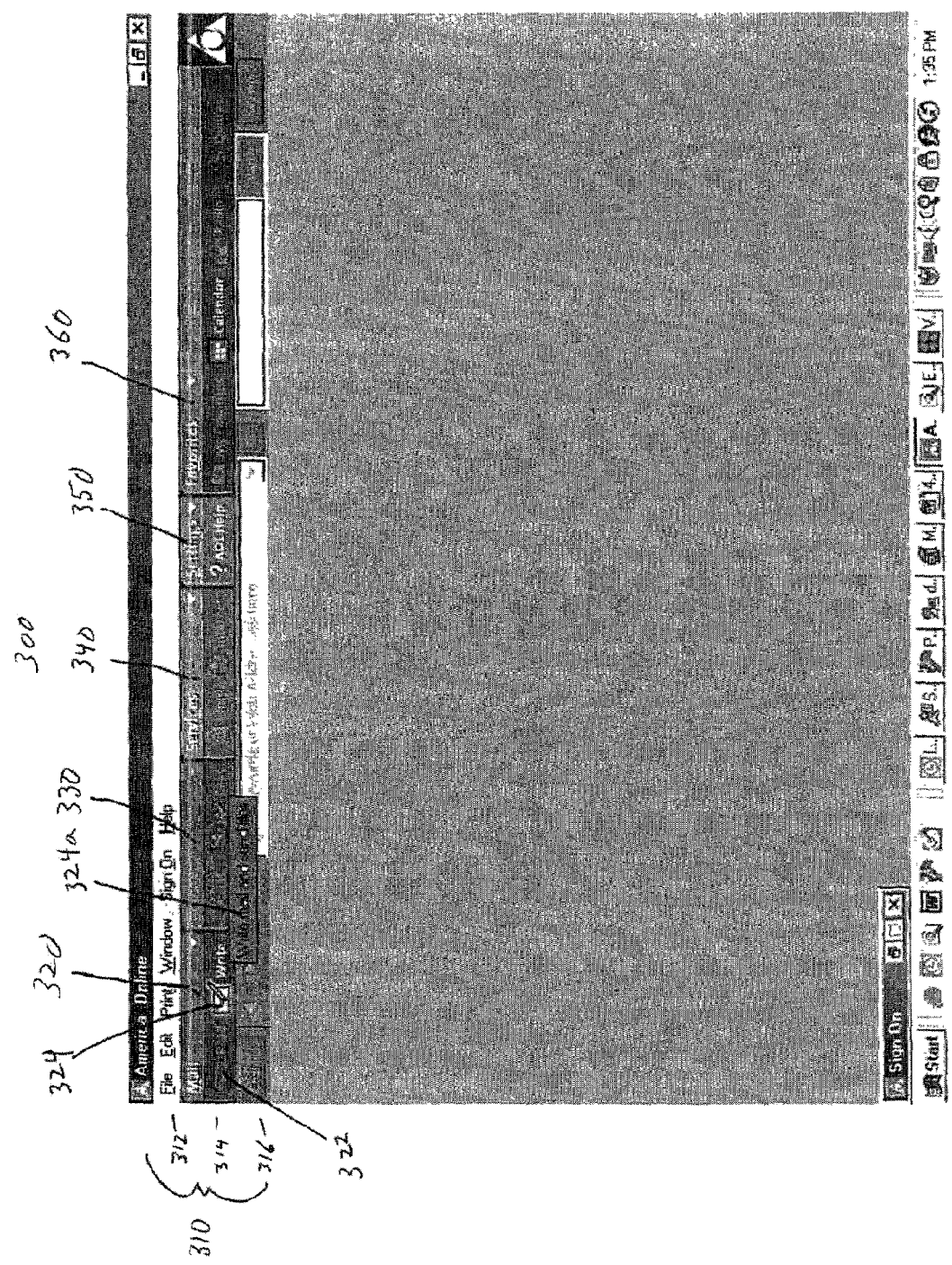

The menu items may be, for instance, icons, buttons, or items on drop-down menus. For example, as shown in FIG. 3B, the Mail menu item 320 may include a Read menu item icon 322 and a Wire menu item icon 324. A user can find out the function of each menu item in the toolbar 310 by, for example, positioning a pointer over the icon or button for a few seconds to display a help message, which also may share a visual identifier with the corresponding menu item. For example, as shown in FIG. 3B, the user may find out the function of Write menu item icon 324 by positioning a pointer over Write menu item icon 324 and waiting for a few seconds until help message 324a is displayed. In FIG. 3B, the help message 324a shares a visual identifier, in this case a blue background color, with the Write menu item icon 324 to which it corresponds.

A user may customize the toolbar 310. For example, the user may modify a menu item to include links to submenu items or content, and thus associate the visual identifier of the menu item with the linked submenu item or content. In one instance, the favorites 360 menu item may be modified to include links to the user's favorite online places, which favorite online places will then share at least one visual identifier with the associated Favorites 360 menu item.

Also, the user or the host may dynamically modify the visual identifier for one or more menu items. For example, the user may change the color of the Favorites menu item from maroon to yellow. Such a modification may be propagated manually or automatically to submenu items associated with the menu item. For example, in response to a change to the color for the favorites menu item, the color for submenu items associated with the favorites menu item may be changed automatically to yellow. As will be described in greater detail with respect to FIG. 9, such a propagation of change may be effected expressly by changing the attributes of each submenu item in response to a change in attributes to a corresponding menu item, or it may be effected impliedly by merely referencing an attribute of a menu item when rendering submenu items for the menu.

As the user navigates to different areas of the online service and the Internet, the user typically will be presented with different UIs. In general, however, the toolbar 310 will be included in each UI that is presented to the user to allow persistent access to the functions associated with the menu items. In this manner, the menu items retain their visual identifier to allow the user to associate the menu items with the desired grouping corresponding to the visual identifier.

The menu bar 312 includes one or more menu item buttons. Each menu item button is generally associated with a corresponding drop-down menu having sub-menu items with options related to the menu item button. To display the drop-down menu associated with the menu item button, a user selects the menu item button, for example, by using a pointing device or by simultaneously pressing the ALT key and the underlined letter in the menu item button. The drop-down menus may include one or more cascading sub-menus depending on the sub-menu item options related to the menu item button, any or all or which may share the visual identifiers with the related menu item buttons.

The icon bar 314 includes one or more menu item icons, which also may be selected using a pointing device or key strokes. Selecting a menu item icon may, for example, cause one or more of the following to occur: display a pop-up window or dialog box; initiate a particular function; directly link to an area of the online service or the Internet; or display a drop-down menu having options related to the menu item icon. The drop-down menus also may include one or more cascading sub-menus depending on the sub-menu item options related to the menu item icon, any or all or which may share visual identifiers with the related menu item.

The navigation bar 316 includes menu items in the form of one or more control interfaces such as navigation buttons, text boxes, and action buttons. The navigation bar 316 seamlessly integrates and displays aspects of a browser application into the OSP graphical UI 300. As such, the control interfaces may be used to invoke browsing functionality with respect to either or both of an OSP host complex and the Internet. Control interfaces that are available to a user are visually distinguished from control interfaces that are not available. For example, the control interfaces that are not available to the user may appear in gray while control interfaces that are available may appear in black.

FIGS. 4-7 show UIs 400, 500, 600, and 700, including toolbar UIs functioning to render, for example, drop-down menus 420, 540, 650, and 760 associated with the selection of menu items 320, 340, 350, and 360, respectively.

Figure 4:
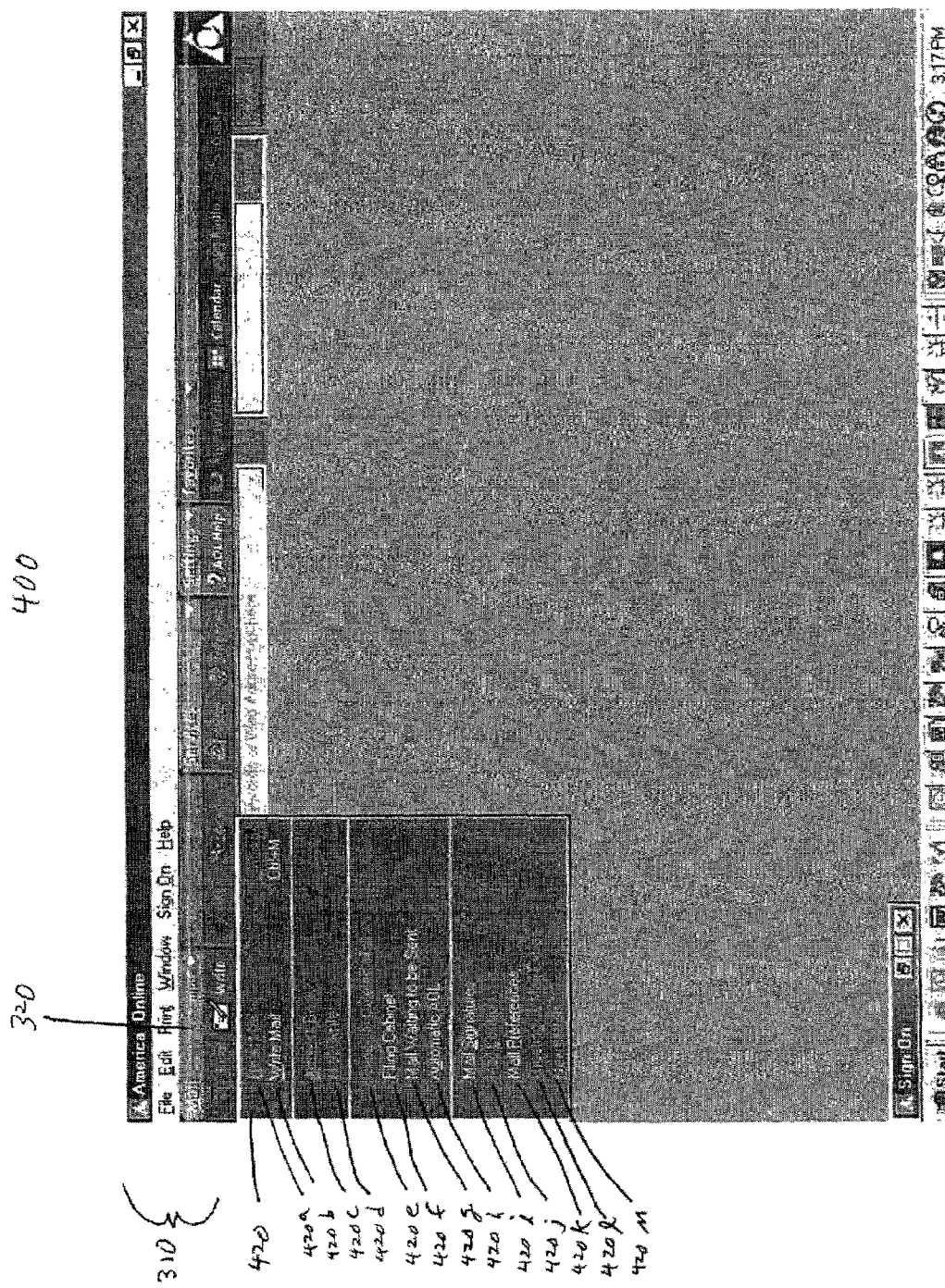

In particular, referring to FIG. 4, a UI 400 includes a toolbar UI 310 and shows a drop-down menu 420 rendered by selecting the Mail command 320. The Mail command 320 can be selected by simultaneously pressing the ALT key and the letter "M" or by simply selecting the Mail icon in the icon bar using a pointing device. Upon selection of the Mail command, the client system performs the function associated with the Mail menu item, i.e., it renders the drop-down menu 420. The drop-down menu 420 contains several first level sub-menu items including, for example, Read Mail 420a, Write Mail 420b, Address Book 420c, Mail Center 420d, Recently Deleted Mail 420e, Filing Cabinet 420f, Mail Waiting to be Sent 420g, Automatic AOL 420h, Mail Signatures 420i, Mail Controls 420j, Mail Preferences 420k, Greetings & Mail Extras 420l, and Newsletters 420m.

Drop-down menu 420 may be considered a first level submenu of the Mail command menu item 320 that shares a visual identifier, in this case the blue background color, with the Mail command menu item 320. Drop-down menu 420 may be viewed as containing first level submenu items 420a-420m that also share a visual identifier, in this case the blue background color, with menu item 320.

Figure 5:
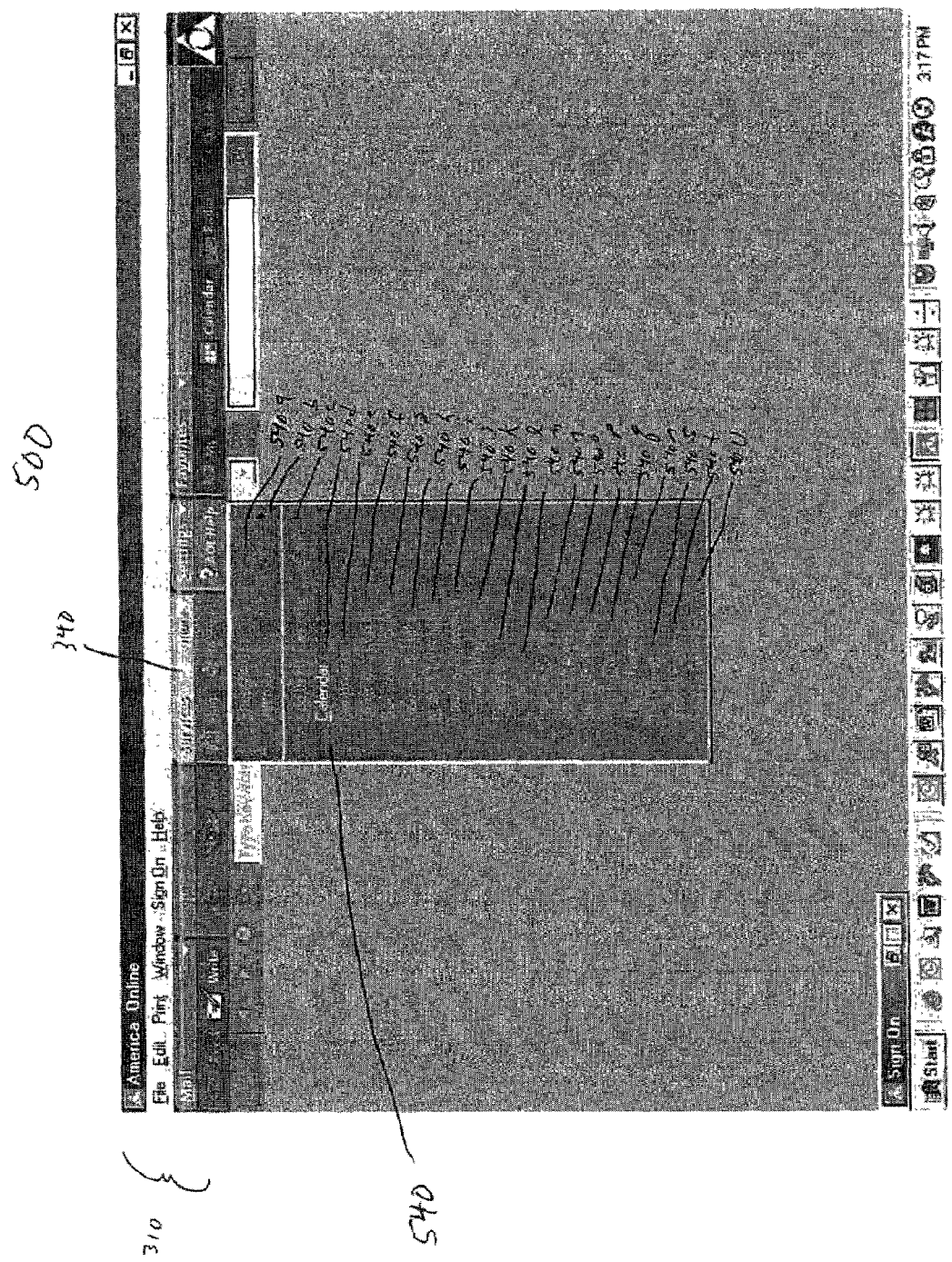

Referring to FIG. 5, a UI 500 includes a toolbar UI 310 and shows a drop-down menu 540 displayed by selecting the Services command 340. The Services command 340 can be selected by simultaneously pressing the ALT key and the letter "c" or by simply selecting the Services icon in the icon bar. Upon selection of the Services command, the client system performs the function associated with the Services menu item, i.e., it renders the drop-down menu 540. The drop-down menu 540 contains several first level sub-menu items 540a-540u.

Drop-down menu 540 may be considered a first level submenu of the Services command menu item 340 that shares a visual identifier, in this case the purple background color, with the Services command menu item 340. Drop-down menu 540 may be viewed as containing first level submenu items 540a-540u that share a visual identifier, in this case the purple background color, with menu item 340.

Figure 6:
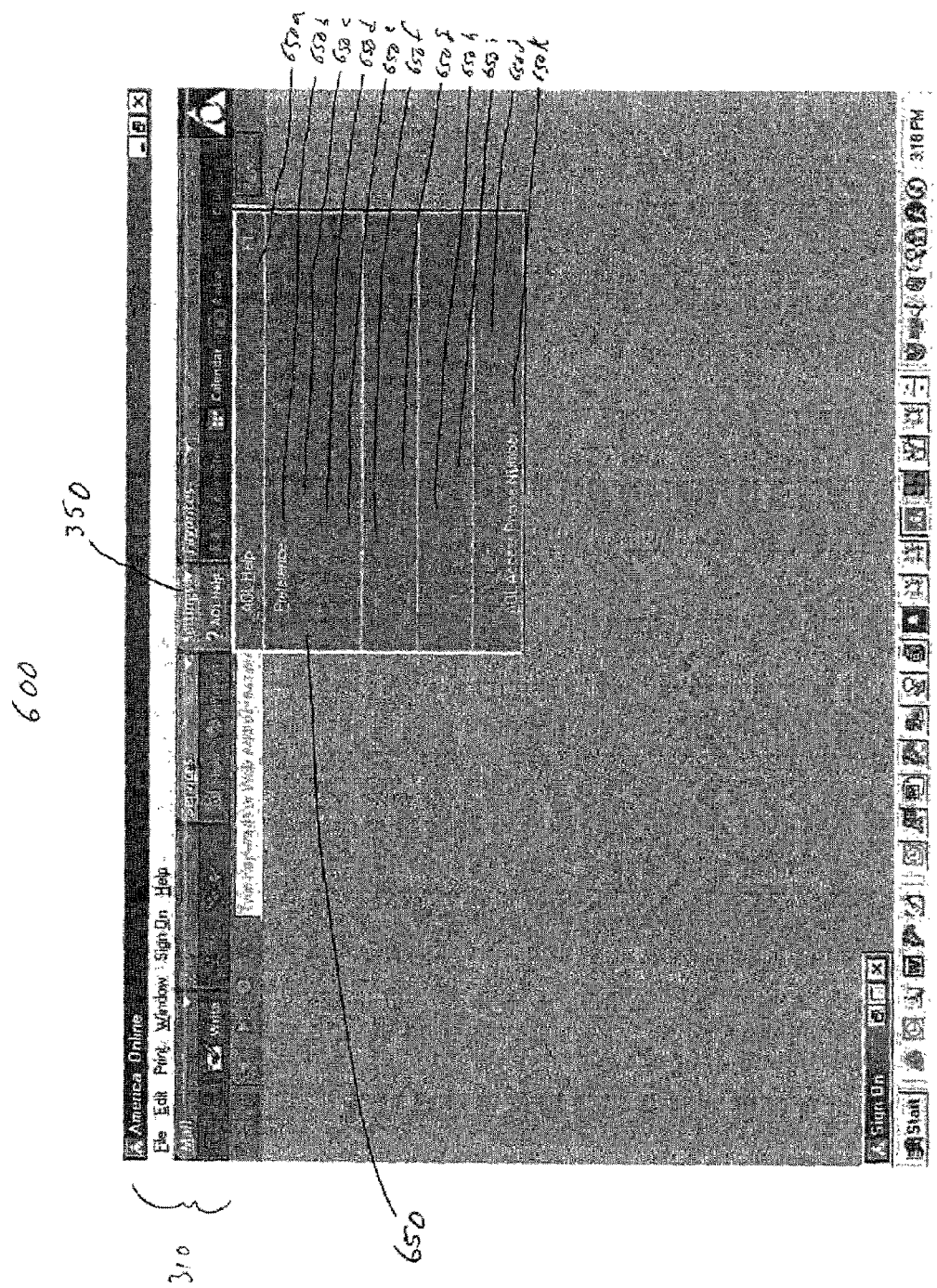

Referring to FIG. 6, a UI 600, includes a toolbar UI 310 and shows a drop-down menu 650 displayed by selecting the Settings command 350. The Settings command 350 can be selected by simultaneously pressing the ALT key and the letter "S" or by simply selecting the Settings icon in the icon bar. Upon selection of the Settings command, the client system performs the function associated with the Settings menu item, i.e., it renders the drop-down menu 650. The drop-down menu 650 contains several first level sub-menu items, 650a-650k.

Drop-down menu 650 may be considered a first level submenu of the Settings command 350 menu item that shares a visual identifier, in this case the aqua background color, with the Settings command menu item 350. Drop-down menu 650 may be viewed as containing first level submenu items 650a-650k that share a visual identifier, in this case the aqua background color, with menu item 350.

Figure 7:
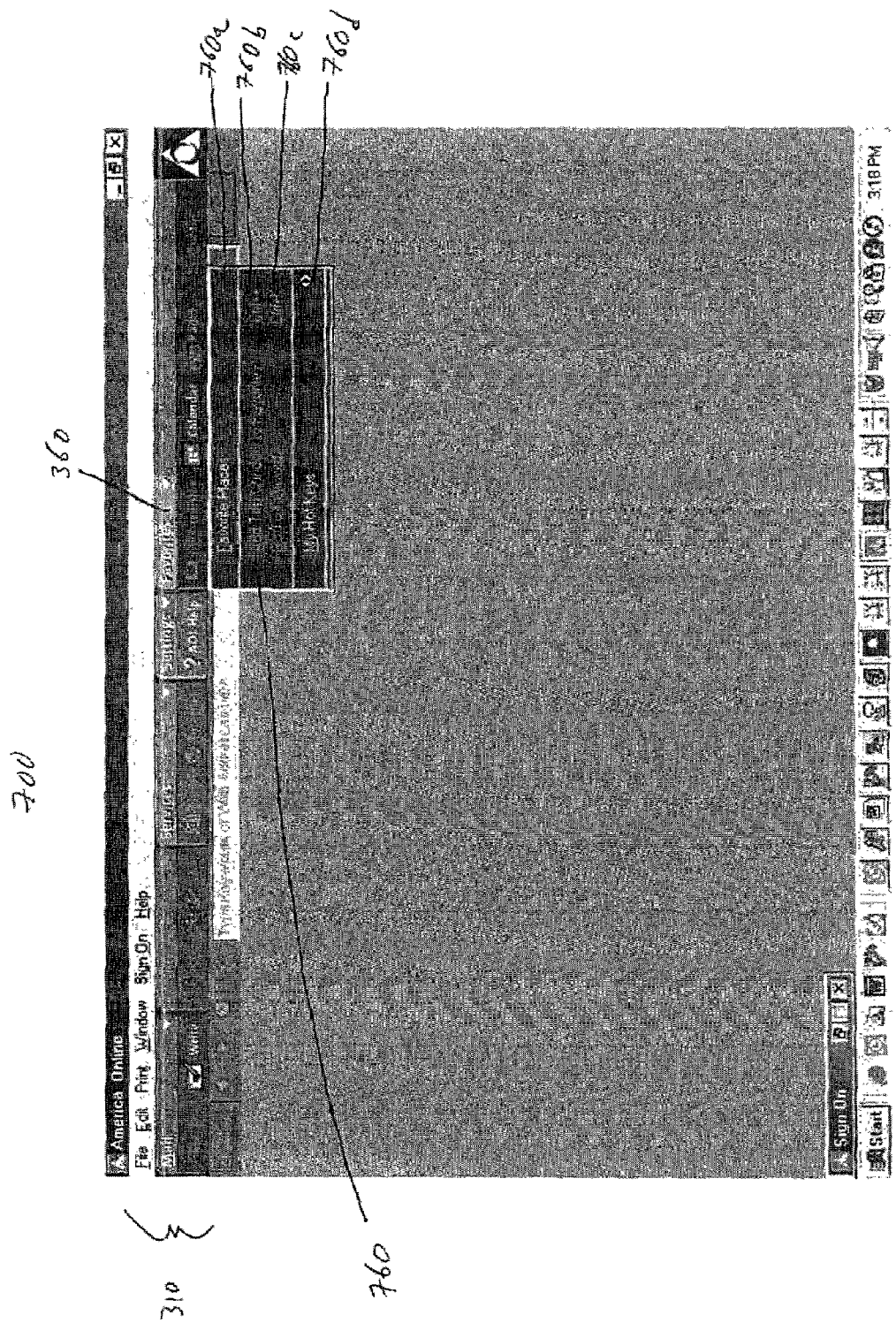

Referring to FIG. 7, a UI 700 includes a toolbar UI 310 and, for example, shows a drop-down menu 760 displayed by selecting the Favorites command 360. The Favorites command 360 can be selected by simultaneously pressing the ALT key and the letter "v" or by simply selecting the Favorites icon in the icon bar. Upon selection of the Favorites command, the client system performs the function associated with the Favorites menu item, i.e., it renders the drop-down menu 760. The drop-down menu 760 contains several first level sub-menu items such as, for example, Favorite Places 760a, Add Top Window to Favorites 760b, Go To Keyword 760c, and My Hot Keys 760d.

Drop-down menu 760 may be considered a first level submenu of the Favorites command menu item 360 that shares a visual identifier, in this case the maroon background color, with the Favorites command menu item 360. Drop-down menu 760 may be viewed as containing first level submenu items 760a-760d that share a visual identifier, in this case the maroon background color, with menu item 360.

Figure 8:
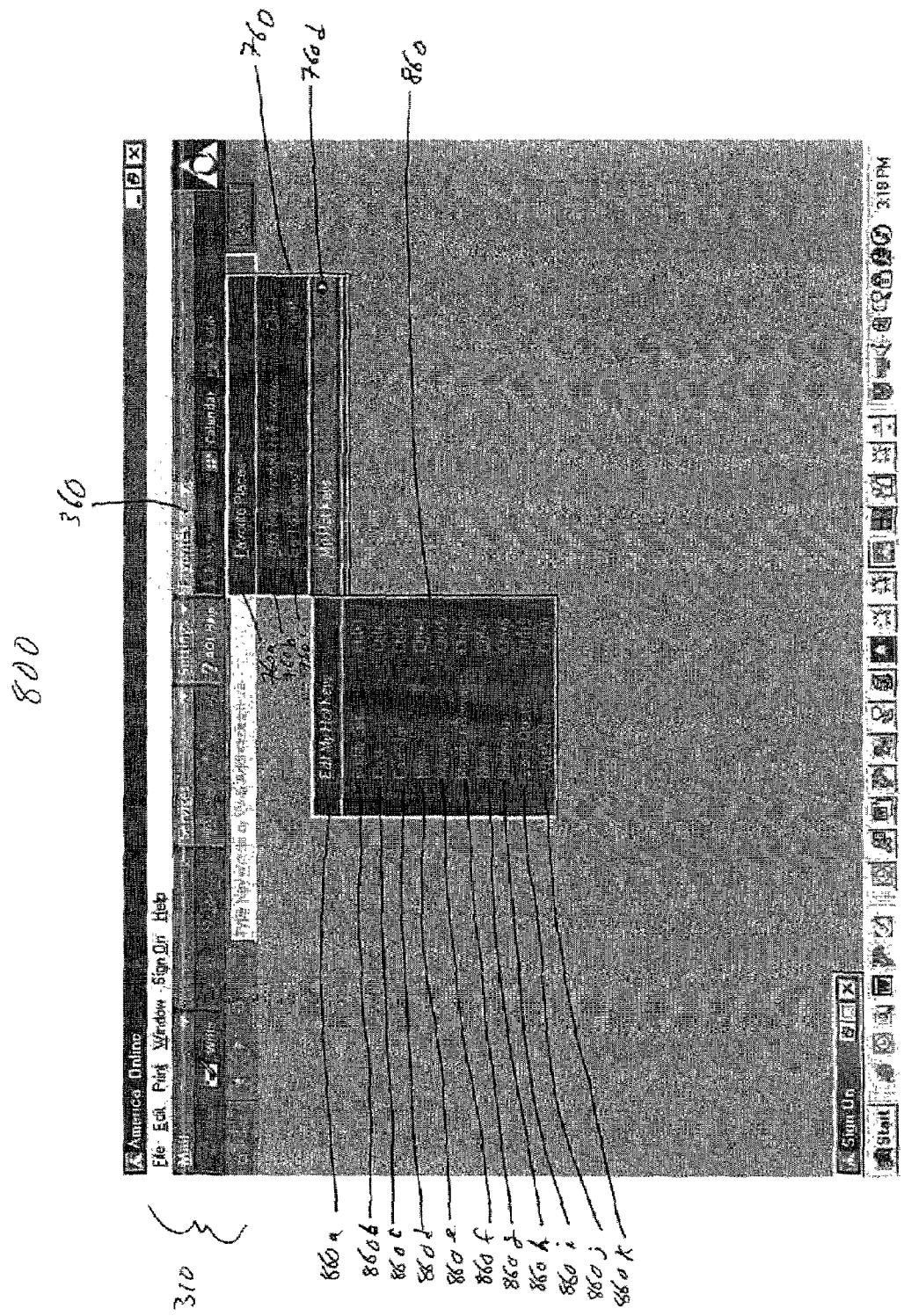

FIG. 8 shows UI 800 including a toolbar UI 310 functioning to render first level drop-down menu 760 associated with the selection of the Favorites command 360, and further functioning to render second level drop-down menu 860 corresponding to the selection of first level submenu item 760d, which corresponds to the My Hot Keys command.

The My Hot Keys command 760d can be selected by simultaneously pressing the ALT key and the letter "M" or by simply selecting the My Hot Keys icon in the drop-down menu 760. Upon selection of the My Hot Keys command, the client system renders the drop-down menu 860. The drop-down menu 860 contains several second level sub-menu items such as, for example, edit My Hot Keys 860a, Buddy List 860b, Chat 860c, Calendar 860d, Help 860e, Internet 860f, Member Rewards 860g, News 860h, Shopping 860i, Stock Quotes 860j, and What's New 860k. Dropdown menu 860 may be viewed as a second level submenu of the Favorites button 360 menu item with second level submenu items 860a-860k that share a visual identifier, in this case the maroon background color, with first level submenu 760 and first level submenu items 760a-760d.

Figure 9:
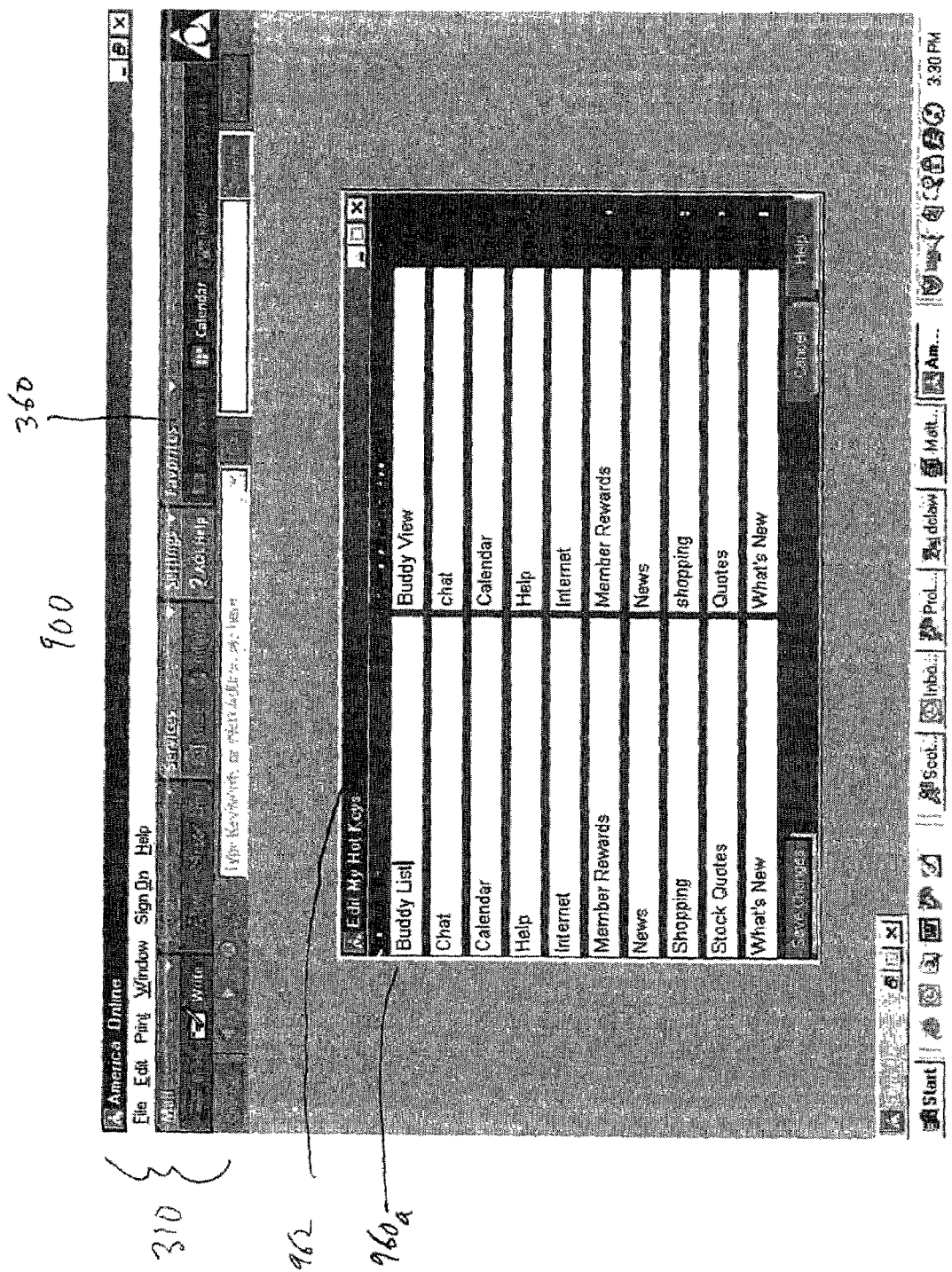

FIG. 9 shows UI 900 including a toolbar UI 310 functioning to render a UI of Edit My Hot Keys 960a corresponding to the selection of second level submenu item 860a. In one implementation, the background color of UI 960a shares a visual identifier, in this case the maroon background color, with second level submenu item 860a. Furthermore, in addition or as an alternative to the background, the title bar 962 of the UI 960a may share a visual identifier, in this case a maroon color, with the second level submenu item 860a (not shown).

Although FIGS. 4-8 describe items 320, 340, 350 and 360 as menu items, items 420, 540, 650 and 760 as first level submenus, and item 860 as a second level submenu, other characterizations are possible. For example, items 420, 540, 650, and 760 may be characterized as menu items, and item 860 may be characterized as a first level submenu.

Figure 10:
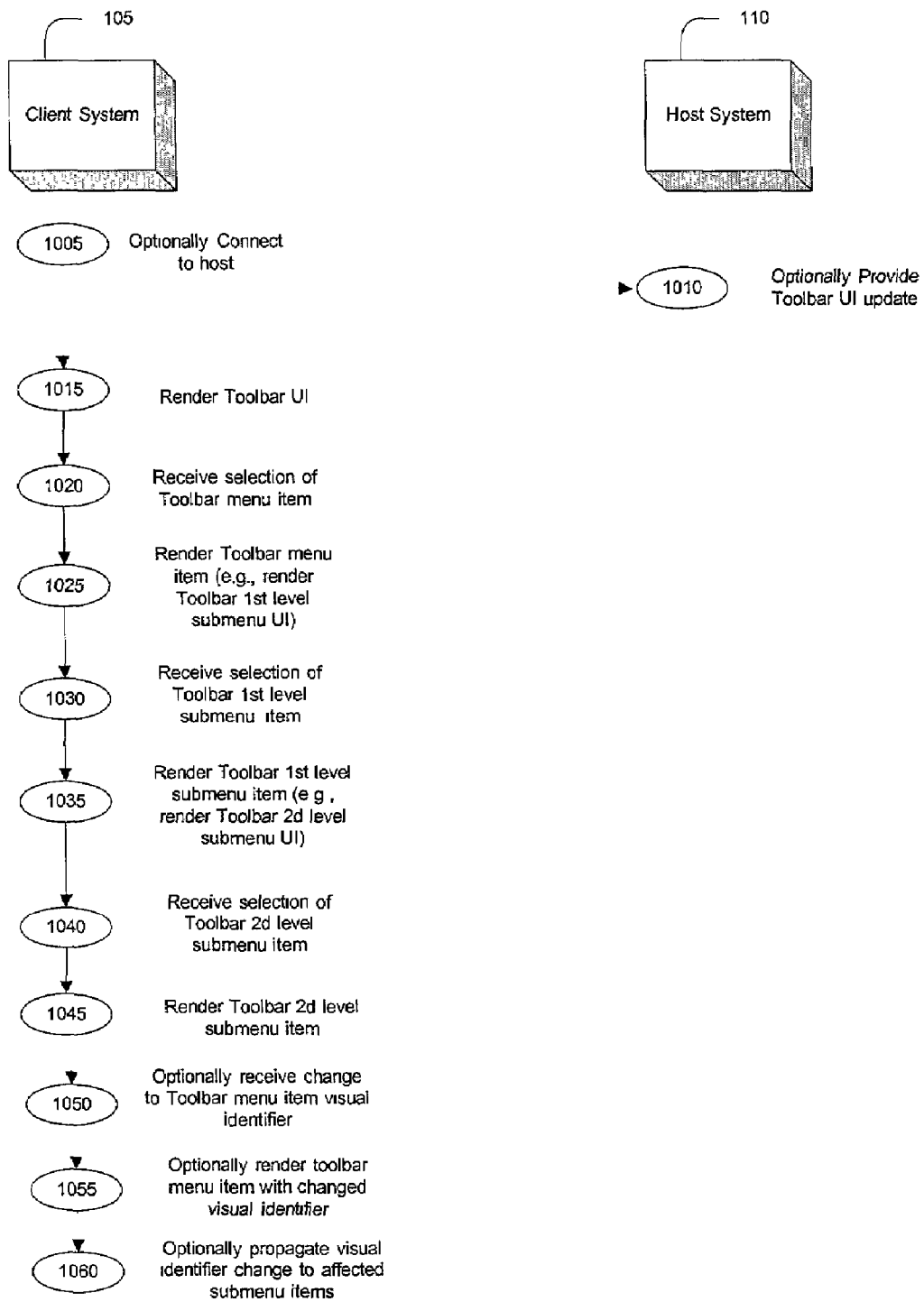
FIG. 10 is a flow chart of a process that may be implemented by the system of FIGS. 1 and 2.

Referring to FIG. 10, a client system 105 and a host system 110 interact according to a procedure 1000 to group menu items of a graphical user interface. The procedure 1000 may be implemented by any type of hardware, software, device, computer, computer system, equipment, component, program, application, code, storage medium, or propagated signal. Furthermore, although not shown in FIG. 10, the client system 105 and the host system 110 may be directly or indirectly interconnected through known or described delivery networks, examples of which are described with respect to network 160. In one implementation, the procedure 1000 may be implemented in a client/host context, and the toolbar user interface may be accessed or updated through a remote device in a client/host environment. In another implementation, the procedure 1000 may be implemented in a standalone or offline client context such as, for example, described above with respect to FIG. 2. The toolbar user interface may be rendered by the standalone/offline device and may be accessed or updated through a remote device in a non-client/host environment such as, for example, a LAN server serving an end user or a mainframe serving a terminal device. Thus, the procedure 1000 described below may be implemented for any toolbar UI of any OSP, ISP, browser and/or other software program having a graphical user interface, such as programs for word processing, stand-alone browsers, spread sheets, and drawing programs.

Procedure 1000 generally involves grouping menu items of a graphical user interface according to one or more visual identifiers. The visual identifier corresponding to a given menu item generally differs from the visual identifiers associated with other menu items.

While some functions of procedure 1000 may be performed entirely by the client system 105, other functions may be performed by the collective operation of the client system 105 and the host system 110. Typically, in this situation, the client system 105 sends a data request associated with the toolbar second level submenu item to the host system 110.

Upon receiving the data request associated with the second level submenu item from the client system 105, the host system 110 retrieves the requested data needed to perform the function associated with the second level submenu item, and sends the requested data to the client system 105. Once the client system 105 receives the necessary data from the host system 110, the client system 105 can perform the function associated with the second level submenu item. For example, as previously described, FIGS. 4-7 show examples of rendering a first level drop-down menu and first level drop-down menu items, FIG. 8 shows an example of rendering a second level drop-down menu and second level drop-down menu items, and FIG. 9 shows a rendering of a toolbar UI in response to selection of a second level toolbar item.

In procedure 1000, the client system 105 and the host system 110 optionally may be physically and/or logically connected (step 1005). For instance, client system 105 may connect to the host system 110 across a network (e.g., network 160) by supplying a user identification and password to a server (e.g., a login server) of the host system 110.

The host system 110 optionally may provide software updates and current data, such as updates to a toolbar UI, to the client system 105 (step 1010). In one implementation, the client system 105 communicates with the host system 110 over a network 160 to supply a toolbar UI update. In general, a toolbar UI update may be made automatically, by default, or through choice. For example, a toolbar UI update may be automatically made absent information to the contrary from the client system. The client system 105 or the host system 110 may request the toolbar UI update at any time. The request for a toolbar UI update also may be made on a periodic basis by the client system 105 or the host system 110. Steps 1005 and 1010 are optional, as indicated by the dashed lines in FIG. 10.

Next, the client system 105 renders a toolbar UI, examples of which were described with respect to FIGS. 3A, 3B, and 4-9 (step 1015). In one implementation, the data required to render the toolbar UI is stored locally on the client system 105. In other implementations, however, the client system 105 may render the toolbar UI using the software updates and current data provided by the host system 110. The toolbar UI may be presented using a Web page having text, images, audio, video, and/or any other type of content.

The toolbar UI has one or more menu items, and each menu item has one or more visual identifiers. The menu items may have one or more submenu items, which share at least one of the visual identifiers of the corresponding menu item. For example, FIG. 3A, as described previously in greater detail, illustrates an example of a toolbar UI 300 that may be rendered according to step 1015.

Using the client system 105, a user can select an icon, drop-down menu item, button, or other toolbar menu item on the toolbar UI associated with a desired function, and such selection may be received by the client system 105 (step 1020).

The client system 105, alone or in combination with the host system 110, then performs the function associated with the toolbar menu item (step 1025). Some functions associated with the toolbar menu item, such as rendering a toolbar UI or drop-down menu from data stored locally on the client system 105, may be performed entirely by the client system 105. The rendered toolbar UI or drop-down menu item may contain one or more submenu items. For ease of discussion, a submenu item contained in a menu item is referred to as a first level submenu item, and a submenu item contained in a first level submenu item is referred to as a second level submenu item.

The rendered toolbar UI or drop-down menu has at least one visual identifier, and each visual identifier corresponding to the rendered UI or drop-down menu is different from the visual identifier corresponding to the other menu items. Attributes of the visual identifiers are associated with the UI and objects within the UI, such that selection of a UI for display invokes access to attributes for that UI, such as, for example, adding color to the display screen.

In one implementation, the attributes of the visual identifiers associated with the menu items may be stored at a centralized location or at one or more distributed locations. When a submenu item is to be displayed, attributes such as the visual identifiers associated with the currently displayed menu item may be referenced, and those attributes may be used when rendering the submenu item. For example, the attributes currently stored in a memory of the client or the host may be read and used when rendering the submenu item. This approach may be repeated for the various progressive levels of submenu items. For example, the second level submenu item may be rendered with reference to the display attributes stored in a memory that were used for rendering the first level submenu item, or they may instead be rendered with reference to display attributes stored specific to the particular submenu(s) being rendered.

In either implementation describe by this example, an attribute table including visual identifiers for certain of the menu items and submenu items may be stored and used to supply visual identifiers when a menu item or submenu item is to be rendered. However, in one of the implementations, an attribute for a hierarchically superior menu or submenu item may be referenced when rendering that menu or submenu item and all hierarchically inferior or subordinate menu or submenu items. By contrast, in another implementation, an attribute for each menu or submenu item is referenced when rendering that menu or submenu item. In this latter implementation, a relationship may exist between the attributes of different menu or submenu items to enable changes to one to automatically propagate to others.

Using the client system 105, a user can select an icon, drop-down menu item, button, or other toolbar first level submenu item on the toolbar UI associated with a desired function, and such selection may be received by the client system 105 (step 1030).

The client system 105, alone or in combination with the host system 110, then performs the function associated with the first level submenu item (step 1035). Some functions associated with the first level submenu item, such as displaying a UI or drop-down menu from data stored locally on the client system 105, may be performed entirely by the client system 105. The displayed UI or drop-down menu item may contain one or more second level submenu items. For example, FIG. 8, shows an example of a rendering of a second level drop-down menu 860 in response to selection of a first level drop-down menu item 760*d*.

The rendered UI or drop-down menu has at least one visual identifier, and each visual identifier corresponding to the rendered UI or drop-down menu is different from the visual identifier corresponding to the other first level submenu items associated with the other menu items. The visual identifier for the first level submenu item matches the visual identifier of the associated menu item.

Using the client system 105, a user can select an icon, drop-down menu item, button, or other toolbar second level submenu item on the toolbar UI associated with a desired function, and such selection may be received by the client system 105 (step 1040).

The client system 105, alone or in combination with the host system 110, then performs the function associated with the second level toolbar submenu item (step 1045). Some functions associated with the second level toolbar submenu item, such as rendering a UI or drop-down menu from data stored locally on the client system 105, may be performed entirely by the client system 105. The displayed UI or drop-down menu item may contain one or more third level submenu items.

The rendered UI or drop-down menu has at least one visual identifier, and each visual identifier corresponding to the rendered UI or drop-down menu is different from the visual identifier corresponding to the other second level submenu items associated with the other first level menu items. The visual identifier for the second level submenu item matches the visual identifier of the associated first level menu item.

Using the client system 105, a user can select an icon, drop-down menu item, button, or other toolbar menu item on the toolbar UI and optionally may make a change to a visual identifier (step 1050). For example, a user may change the color of the Favorites button 360 from maroon to yellow. Such a change may be pulled by or pushed to the client system. For example, when the host system 110 updates the color associated with the Favorites button 360 from maroon to yellow, it may allow accessing client system 105 to access and pull that information, or alternatively it may push the change in color to the client system 105.

The client system 105 then renders the toolbar menu item with the changed visual identifier (step 1055). The client system may refresh only the changed portion of the toolbar UI, or may render the entire toolbar UI including the changed portion. For example, in response to the above-described change in color, the client system may refresh only a portion of the UI 300 that includes a Favorites button 360 having a yellow color.

The change to the visual identifier is propagated to submenu items associated with the changed menu item (step 1060). The change to the visual identifier may be propagated to submenu items when the change is made to the menu item, or the change may be propagated at a later time, such as, for example, at a time when the affected submenu item is to be rendered by the client system 105. For example, the client system may propagate a change of color from maroon to yellow in the Favorites button 360 to a first level submenu 760 and to first level submenu items 760*a*-760*d*, and may render the first level submenu and first level submenu items with a yellow background color. Similarly, the client system may propagate the change of color to second level submenu 860 and second level submenu items 860*a*-860*k*, and may render the second level submenu and second level submenu items with a yellow background color. The change in visual identifier may be propagated in a similar manner to other levels of submenu items, such as, for example, third and fourth level submenu items.

Steps 1050 to 1060 are optional, as indicated by the dashed lines in FIG. 10. Furthermore, the relative placement of steps 1050, 1055 and 1060 with respect to other steps in FIG. 10, and with respect to each other, may vary.

Other implementations are within the scope of the following claims.

What is claimed is:

1. A method for visually displaying a grouping of menu items within a graphical user interface, the method comprising:

rendering a toolbar user interface,
the toolbar user interface comprising one or more menu items, each menu item comprising one or more visual identifiers,
  at least one menu item comprising one or more submenu items comprising the one or more visual identifiers of the corresponding menu item to distinguish the submenu item from submenu items corresponding to other of the menu items;
rendering a submenu item using the one or more visual identifiers associated with the menu item to which the submenu item corresponds;
receiving a modification to one or more of the visual identifiers associated with a selected menu item or one of its corresponding submenu items;
detecting the modification; and
automatically triggering, based on the detected modification, a corresponding modification to the one or more visual identifiers associated with at least one other of the selected menu item and its corresponding submenu items.

2. The method of claim 1, in which the visual identifier comprises a color.

3. The method of claim 1, in which the visual identifier comprises a shading.

4. The method of claim 1, in which the visual identifier comprises a visual texture.

5. The method of claim 1, in which the visual identifier comprises a font.

6. The method of claim 1, in which each visual identifier of each menu item differs from all other visual identifiers corresponding to all other menu items.

7. The method of claim 1, in which a visual identifier of a menu item differs from a visual identifier corresponding to an adjacent menu item to distinguish the menu item from the adjacent menu item.

8. The method of claim 1, in which a visual identifier of a menu item differs from a visual identifier corresponding to each adjacent menu item to distinguish the menu item from each adjacent menu item.

9. The method of claim 1, in which a visual identifier of a menu item is unique to the visual identifiers of other of the menu items.

10. The method of claim 1, further comprising rendering a menu item help message comprising a visual identifier in response to user input, in which the visual identifier of the help message is the same as the visual identifier of the corresponding menu item.

11. The method of claim 1, in which a submenu item comprises a customized link to an object that is configured to share the submenu item visual identifier with the submenu item.

12. The method of claim 1, in which the visual identifier is shared with a non-menu item linked to the menu item.

13. The method of claim 1, in which the visual identifiers corresponding to the menu items are established in a title bar.

14. The method of claim 1, in which the submenu item comprises a drop-down menu selection.

15. The method of claim 1, in which the submenu item comprises a glow button.

16. The method of claim 1, in which modifying the visual identifier comprises automatically modifying the visual identifier based on a modification to a visual identifier of at least one other menu item.

17. The method of claim 1, in which modifying the visual identifier comprises periodically modifying the visual identifier based on a modification to a visual identifier of at least one other menu item.

18. The method of claim 1, in which the visual identifier is modified by a client system.

19. The method of claim 1, in which the modification of the visual identifier of the submenu item is performed periodically.

20. The method of claim 1, in which the visual identifier is modified by a host system.

21. The method of claim 1 in which the submenu item further comprises one or more second level submenu items comprising one or more visual identifiers of the corresponding submenu item to distinguish the second level submenu item from second level submenu items corresponding to other of the submenu items.

22. The method of claim 21 further comprising rendering a second level submenu item.

23. A menu item grouping article of manufacture, the article of manufacture being configured to:
  render a toolbar user interface having a toolbar comprising one or more menu items,
    each menu item comprising one or more visual identifiers to distinguish the menu item from other of the menu items,
    at least one of the menu items comprising one or more submenu items;
  render a submenu item, where the submenu item comprises the one or more visual identifiers of the corresponding menu item to distinguish the submenu item from submenu items corresponding to other of the menu items;
  receive a modification to one or more of the visual identifiers associated with a selected menu item or one of its corresponding submenu items;
  detect the modification; and
  automatically trigger, based on the detected modification, a corresponding modification to the one or more visual identifiers associated with at least one other of the selected menu item and its corresponding submenu items.

24. An article of manufacture that includes a computer-readable medium having embodied thereon a computer program, the computer program comprising instructions for:
  rendering a toolbar user interface having a toolbar comprising one or more menu items,
    each menu item comprising one or more visual identifiers to distinguish the menu item from other of the menu items,
    at least one of the menu items comprising at least one submenu item;
  rendering a submenu item, where the submenu item comprises one or more visual identifiers of the corresponding menu item to distinguish the submenu item from submenu items corresponding to other of the menu items;
  receiving a modification to one or more of the visual identifiers associated with a selected menu item or one of its corresponding submenu items;
  detecting the modification; and
  automatically triggering, based on the detected modification, a corresponding modification to the one or more visual identifiers associated with at least one other of the selected menu item and its corresponding submenu items.

25. The article of claim 24 wherein the article comprises a disc.

26. The article of claim 24 wherein the article comprises a client system.

27. The article of claim 24 wherein the article comprises a host device.

28. An article of manufacture that includes a computer-readable medium having embodied thereon a computer program, the computer program including instructions that, when executed, cause a computer to:
- display a graphical toolbar user interface comprising:
  - one or more menu items, each menu item comprising one or more visual identifiers to distinguish the menu item from other of the menu items; and
  - at least one of the menu items comprising at least one submenu item, the submenu item comprising one or more visual identifiers of the corresponding menu item to distinguish the submenu item from submenu items corresponding to other of the menu items,
  - wherein a visual identifier associated with a selected menu item or one of its corresponding submenu items is related to a visual identifier associated with at least one other of the selected menu item and its corresponding submenu items in a manner such that a modification of the visual identifier associated with a selected menu item or one of its corresponding submenu items is received and detected and automatically triggers, based on the detected modification, a corresponding modification to the visual identifier associated with the at least one other of the selected menu item and its corresponding submenu items.

29. The article of claim 28, wherein the instructions that, when executed, cause the computer to display the graphical toolbar user interface include instructions that, when executed, cause the computer to display the graphical toolbar user interface in which the visual identifier comprises a color.

30. The article of claim 28, wherein the instructions that, when executed, cause the computer to display the graphical toolbar user interface include instructions that, when executed, cause the computer to display the graphical toolbar user interface in which the visual identifier comprises a shading.

31. The article of claim 28, wherein the instructions that, when executed, cause the computer to display the graphical toolbar user interface include instructions that, when executed, cause the computer to display the graphical toolbar user interface in which the visual identifier comprises a visual texture.

32. The article of claim 28, wherein the instructions that, when executed, cause the computer to display the graphical toolbar user interface include instructions that, when executed, cause the computer to display the graphical toolbar user interface in which the visual identifier comprises a font.

33. The article of claim 28, wherein the instructions that, when executed, cause the computer to display the graphical toolbar user interface include instructions that, when executed, cause the computer to display the graphical toolbar user interface in which the submenu item comprises a drop-down menu selection.

34. The article of claim 28, wherein the instructions that, when executed, cause the computer to display the graphical toolbar user interface include instructions that, when executed, cause the computer to display the graphical toolbar user interface in which the submenu item comprises a glow button.

35. A computer system for visually displaying a grouping of menu items within a graphical user interface, the computer system comprising:
- one or more processing devices communicatively coupled to each other and configured to:
  - render a toolbar user interface,
    - the toolbar user interface comprising one or more menu items,
    - each menu item comprising one or more visual identifiers,
    - at least one menu item comprising one or more submenu items comprising one or more visual identifiers of the corresponding menu item to distinguish the submenu item from submenu items corresponding to other of the menu items;
  - render a submenu item;
  - receive a modification to one or more of the visual identifiers associated with a selected menu item or one of its corresponding submenu items;
  - detect the modification; and
  - automatically trigger, based on the detected modification, a corresponding modification to the one or more visual identifiers associated with at least one other of the selected menu item and its corresponding submenu items.

36. The computer system of claim 35, in which a visual identifier of a menu item differs from a visual identifier corresponding to an adjacent menu item to distinguish the menu item from the adjacent menu item.

37. The computer system of claim 35, in which a visual identifier of a menu item is unique to the visual identifiers of other of the menu items.

38. The computer system of claim 35, wherein the one or more processing devices are further configured to render a menu item help message comprising a visual identifier in response to user input, in which the visual identifier of the help message is the same as the visual identifier of the corresponding menu item.

39. The computer system of claim 35, wherein the one or more processing devices being configured to modify the visual identifier comprises the one or more processing devices being configured to automatically modify the visual identifier based on a modification to a visual identifier of at least one other menu item.

40. The computer system of claim 35, wherein the one or more processing devices being configured to modify the visual identifier comprises the one or more processing devices being configured to periodically modify the visual identifier based on a modification to a visual identifier of at least one other menu item.

41. The computer system of claim 35, in which the visual identifier is modified by a client system.

42. The computer system of claim 35, in which the visual identifier is modified by a host system.

43. The computer system of claim 35 in which the submenu item further comprises one or more second level submenu items comprising one or more visual identifiers of the corresponding submenu item to distinguish the second level submenu item from second level submenu items corresponding to other of the submenu items.

44. An apparatus for visually displaying a grouping of menu items within a graphical user interface, the apparatus comprising:
- a means for rendering a toolbar user interface,
  - the toolbar user interface comprising one or more menu items,
  - each menu item comprising one or more visual identifiers,
  - at least one menu item comprising one or more submenu items comprising one or more visual identifiers of the corresponding menu item to distinguish the submenu item from submenu items corresponding to other of the menu items;
- a means for rendering a submenu item;

means for receiving a modification to one or more of the visual identifiers associated with a selected menu item or one of its corresponding submenu items;

means for detecting the modification; and means for automatically triggering, based on the detected modification, a corresponding modification to the one or more visual identifiers associated with at least one other of the selected menu item and its corresponding submenu items.

45. The apparatus of claim 44, in which each visual identifier of each menu item differs from all other visual identifiers corresponding to all other menu items.

46. The apparatus of claim 44, in which a visual identifier of a menu item differs from a visual identifier corresponding to an adjacent menu item to distinguish the menu item from the adjacent menu item.

47. The apparatus of claim 44, further comprising a means for rendering a menu item help message comprising a visual identifier in response to user input, in which the visual identifier of the help message is the same as the visual identifier of the corresponding menu item.

48. The apparatus of claim 44, in which the visual identifier is modified by a client system.

49. The apparatus of claim 44, in which the visual identifier is modified by a host system.

50. The apparatus of claim 44 in which the submenu item further comprises one or more second level submenu items comprising one or more visual identifiers of the corresponding submenu item to distinguish the second level submenu item from second level submenu items corresponding to other of the submenu items.

51. The method of claim 1 wherein the modification to the one or more visual identifiers corresponds to an initial configuration of one or more of the visual identifiers.

52. The method of claim 1 wherein the modification to the one or more visual identifiers corresponds to a change to a previously-configured visual identifier.

53. An article of manufacture that includes a computer-readable medium having embodied thereon a computer program, the computer program comprising:

a first code segment configured to produce a first submenu item with a color that is dependent upon a first color to be used in producing a corresponding first menu item, the first code segment being configured to programmatically trigger a change in the first submenu item color based on a detected change in the first color to be applied to the first menu item; and a second code segment configured to produce a second submenu item with a color that is dependent upon a second color to be used in producing a corresponding second menu item and that differs from the first color, the second code segment being configured to programmatically trigger a change in the second submenu item color based on a detected change in the second color to be applied to the second menu item.

54. The article of claim 53 wherein the first submenu item has a color that is consistently different than the first color corresponding to the first menu item.

55. The article of claim 54 wherein the first color corresponding to the first menu item is a lighter shade than a shade of a color of the first submenu item.

56. The article of claim 53 wherein the first submenu item has a color that is consistently the same as the first color corresponding to the first menu item.

57. The article of claim 53 wherein a single color attribute is referenced to establish the colors of the first menu item and the first submenu item.

58. The article of claim 57 wherein the color attribute maintains consistency among the colors of first menu item and the first submenu item.

59. The method of claim 1 wherein detecting the modification comprises detecting a modification that modifies the one or more visual identifiers associated with the selected menu item or one of its corresponding submenu items to be different than the one or more visual identifiers associated with the at least one other of the selected menu item and its corresponding submenu items.

60. The menu item grouping article of claim 23 wherein the article is configured to detect a modification that modifies the one or more visual identifiers associated with the selected menu item or one of its corresponding submenu items to be different than the one or more visual identifiers associated with the at least one other of the selected menu item and its corresponding submenu items.

61. The article of claim 24 wherein the instructions for detecting the modification comprise instructions for detecting a modification that modifies the one or more visual identifiers associated with the selected menu item or one of its corresponding submenu items to be different than the one or more visual identifiers associated with the at least one other of the selected menu item and its corresponding submenu items.

62. The article of claim 28 wherein the detected modification comprises a modification that modifies the one or more visual identifiers associated with the selected menu item or one of its corresponding submenu items to be different than the one or more visual identifiers associated with the at least one other of the selected menu item and its corresponding submenu items.

63. The computer system of claim 35 wherein the one or more processing devices being configured to detect the modification comprises the one or more processing devices being configured to detect a modification that modifies the one or more visual identifiers associated with the selected menu item or one of its corresponding submenu items to be different than the one or more visual identifiers associated with the at least one other of the selected menu item and its corresponding submenu items.

64. The apparatus of claim 44 wherein the means for detecting the modification comprises means for detecting a modification that modifies the one or more visual identifiers associated with the selected menu item or one of its corresponding submenu items to be different than the one or more visual identifiers associated with the at least one other of the selected menu item and its corresponding submenu items.

* * * * *